Figure 1:
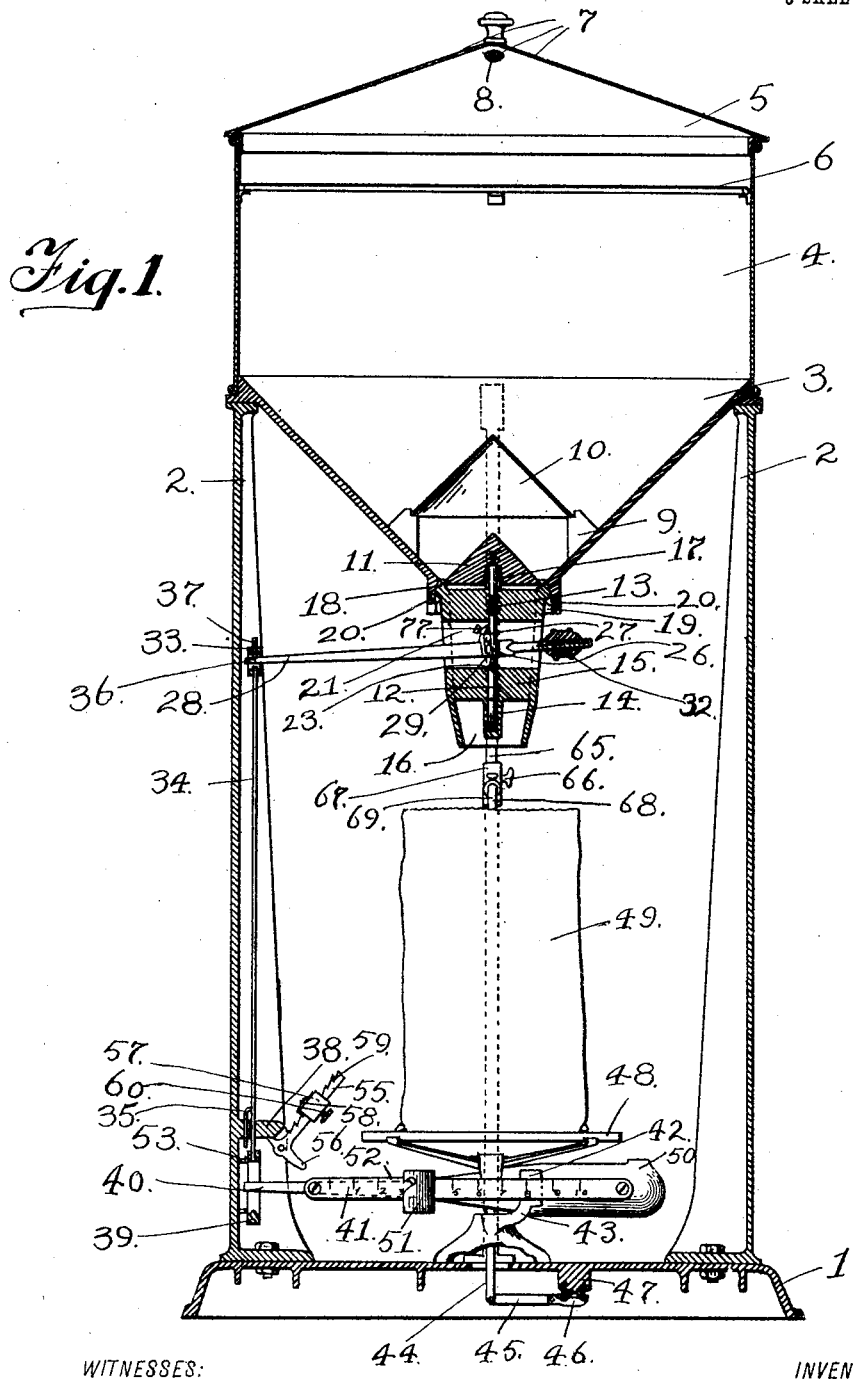

No. 803,376. PATENTED OCT. 31, 1905.
F. F. WEAR.
AUTOMATIC WEIGHING MACHINE.
APPLICATION FILED OCT. 28, 1904.

3 SHEETS—SHEET 1.

WITNESSES:
Arthur L. Slees
Jesse Gorfinkel

INVENTOR
F. F. Wear
BY F. W. Wright
ATTORNEY

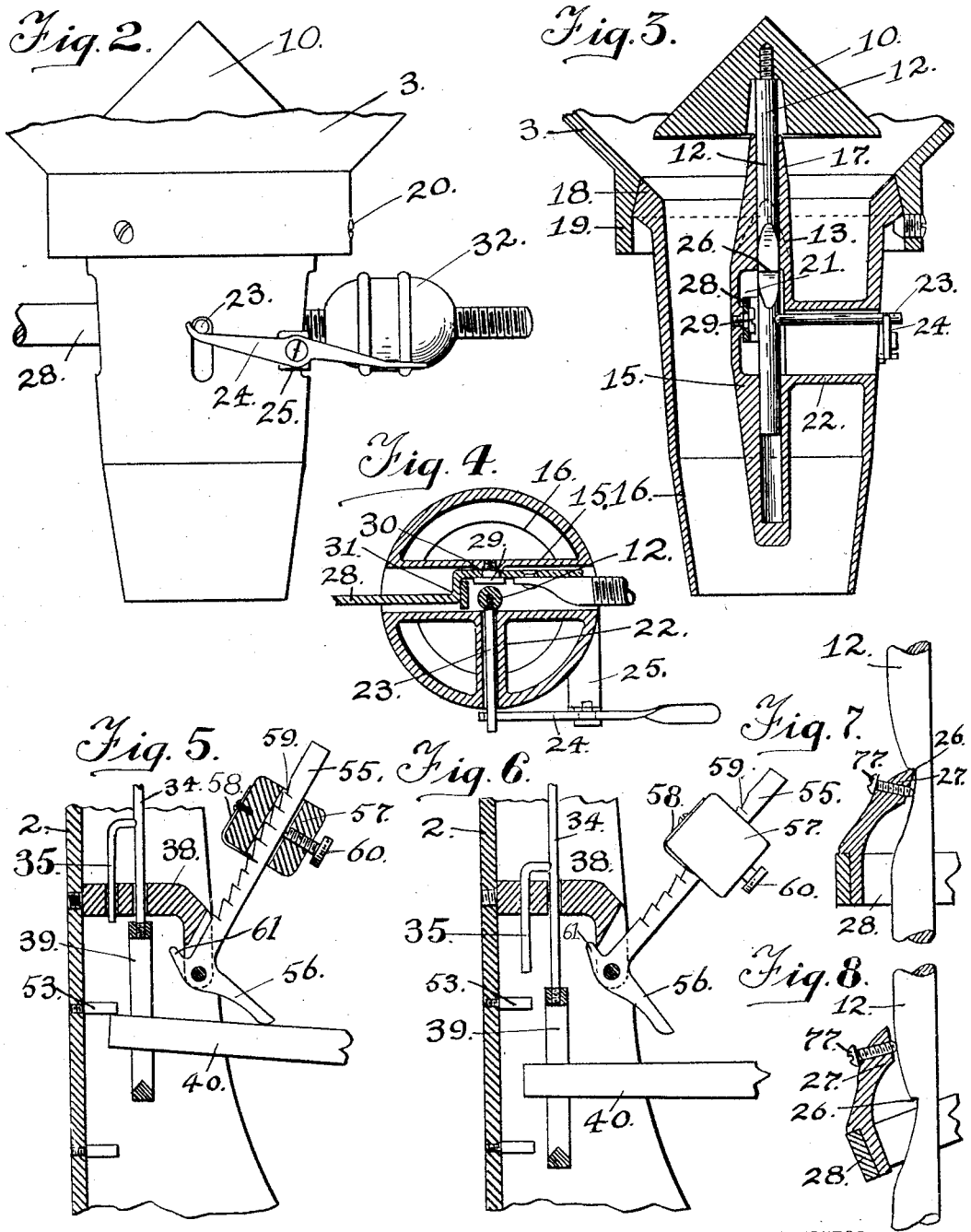

No. 803,376. PATENTED OCT. 31, 1905.
F. F. WEAR.
AUTOMATIC WEIGHING MACHINE.
APPLICATION FILED OCT. 28, 1904.
3 SHEETS—SHEET 3.
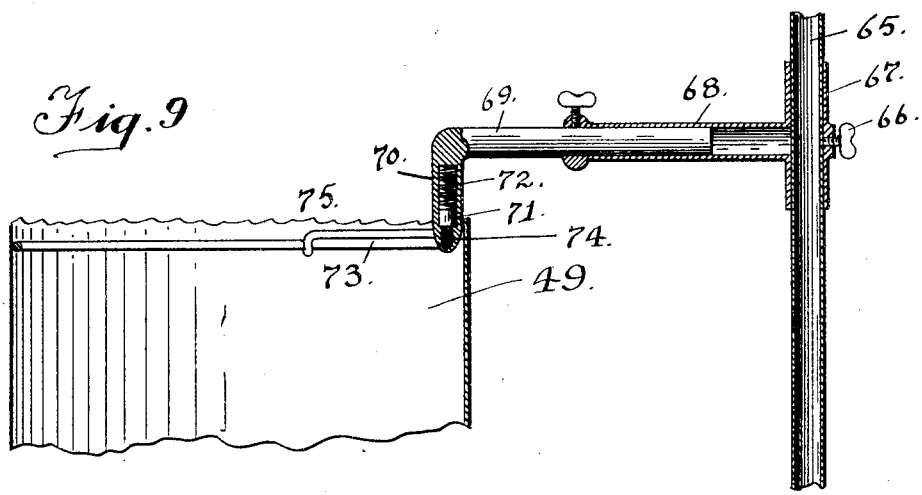
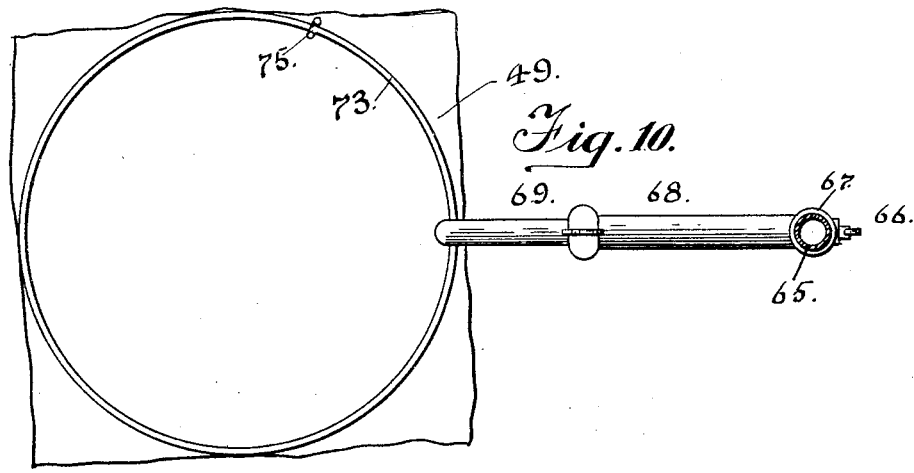
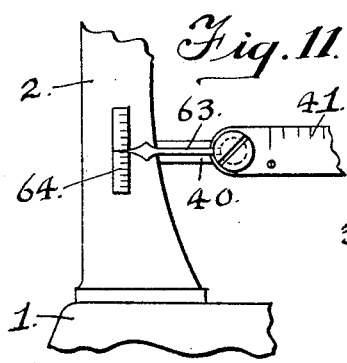
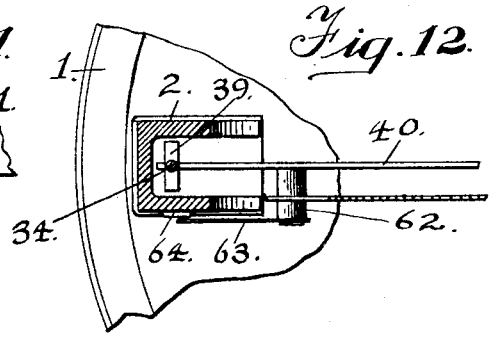
WITNESSES:
INVENTOR
F. F. Wear
BY
F. W. Wright
ATTORNEY

UNITED STATES PATENT OFFICE.

FRANK F. WEAR, OF SAN FRANCISCO, CALIFORNIA.

AUTOMATIC WEIGHING-MACHINE.

No. 803,376.      Specification of Letters Patent.      Patented Oct. 31, 1905.

Application filed October 28, 1904. Serial No. 230,314.

*To all whom it may concern:*

Be it known that I, FRANK F. WEAR, a citizen of the United States, residing at San Francisco, in the county of San Francisco and State of California, have invented certain new and useful Improvements in Automatic Weighing-Machines, of which the following is a specification.

My invention relates to an improved automatic weighing-machine, the object of the invention being to provide an apparatus of this kind which shall be accurate, readily adjustable for weighing different quantities of material, not liable to get out of order, and easily operated.

My invention therefore resides in the novel construction, combination, and arrangement of parts for the above ends hereinafter fully specified, and particularly pointed out in the claims.

In the accompanying drawings, Figure 1 is a vertical section of the machine. Fig. 2 is an enlarged side view of the spout. Fig. 3 is a vertical section thereof. Fig. 4 is a horizontal section thereof. Fig. 5 is a detail vertical section of the equalizing-lever. Fig. 6 is a similar view of the same in a different position. Fig. 7 is a detail view of the valve-stem and finger. Fig. 8 is a similar view of the same in a different position. Fig. 9 is a vertical section of the bag-holder. Fig. 10 is a plan view of the same. Fig. 11 is a detail side view of the index-pointer. Fig. 12 is a horizontal section showing said pointer in plan.

Upon a suitable base 1 are erected diametrically opposite standards 2, which support at their upper ends a conical hopper 3, upon the upper edge of which is removably fitted a cylindrical casing 4, having a lid 5. At a suitable height in said box is provided a horizontal screen 6, upon which, if the device be used for weighing sugar, for instance, the sugar is poured when filling the hopper and casing, thus screening or separating from the sugar any foreign particles, as thread or the like. In the top of the cover are a suitable number of small apertures 7, covered by screens 8, to permit of ventilation, this being important in warm climates if the sugar should be damp.

In the bottom of the hopper is supported by vertical plates 9 a conical shield 10, which shields the valve 11 from the weight of the sugar. Said valve is secured upon a stem 12, sliding in bearings 13 14 in the central vertical web 15 of a spout 16. The shield 10 on account of its conical form, its sides being at an angle of forty-five degrees with the vertical, not only protects the valve from the weight of the sugar, but also, in conjunction with the hopper, causes the sugar to flow uniformly and steadily down around the edge of the shield. The conical valve 11 is also of advantage in assisting to distribute the sugar in its flow, and it also insures a rapid descent of the valve to close the opening when permitted, being assisted to do so by the weight of the sugar. A still more important result arising from this conical form of the valve is that it provides a lower edge which strikes the hopper at substantially a right angle, and this is of great importance in weighing granular material—such as rice, wheat, beans, or the like—as it has been found by practice that with this construction the sharp cutting edge of the valve dropping against the hopper so as to make substantially a right angle therewith immediately cuts in two any grain of such matter which may happen to be between the edge of the hopper at the time of its descent. Were this not the case the valve would be held up slightly, permitting an excess of material to flow underneath.

It will be observed that the valve-stem and all the operating parts connected with the movement of the valve are completely inclosed and that the upper bearing 13 for the valve-stem consists partly of an upward conical extension 17 from the upper surface of the web, which enters a socket in the valve, this extension reaching to such a height as to protect the stem of the valve from contacting with the falling sugar. This complete inclosure of the moving parts is of the greatest importance in weighing such substances as sugar, for very fine particles of sugar if admitted to these moving parts will eventually on account of their sticky character clog the same and impair the efficiency of the apparatus.

The spout 16 is slightly conical in form, tapering downward, and having a flaring upper rim 18, which fits within the circular mouth 19 of the hopper and is supported therein by screws 20, screwed through the wall of said mouth underneath said rim. In the said central web 15 of said spout is formed a vertical slot 21, and between said web 15 and the side of the spout, extending at right angles to the general direction of the web, is a slotted or apertured connection 22, through which passes a pin 23, secured to the valve-stem 12 at right angles thereto. By means of this pin the stem and the valve thereon may be lifted, and to raise the same there is provided a lever 24, pivoted upon a bracket 25, secured upon the outside of the spout, so that by depressing the outer end of said lever the inner end thereof is raised and the pin and valve are also raised. This lever is operated when commencing the operation of weighing the sugar or other material of a granular nature, and by depressing its end the valve is raised, permitting the sugar to flow down through the spout on each side of the web.

When the valve-stem has reached a certain height, a notch 26, formed in the side thereof, is engaged by a finger 27, extending from a lever 28, pivoted at 29 on a boss 30, formed on an inner surface of the vertical slot in the web. This lever is bent, as shown at 31, to be pivoted upon said boss and to pass around the stem. The pivotal axis of this lever is vertically underneath the point of pressure of the valve on the finger. This is an important feature of the invention, because there is no tendency to turn the tripping device due to the weight of the material upon the valve, for no additional support need be given to the finger against the pressure of the valve; but said pressure is resisted merely by the pivot of the lever 28, which carries the finger. There being no resistance to be overcome in operating the trip besides the cam-finger and the stem, which acts at right angles to the pressure of the stem upon the finger, the trip can be operated with a minimum amount of force and is therefore extremely sensitive. The material can thus be automatically weighed with the utmost accuracy.

Upon an extension from the short end of the lever 28 is carried a weight 32, adjustable by being screwed thereon. The tripping mechanism can thus be rendered more or less sensitive by adjusting the weight 32 to counterbalance the weight of the lever 28 more or less. The end of the long arm of the lever passes into a loop 33, secured to the upper end of a sliding trip-rod 34, having a guide member 35 to prevent it turning, the upper surface of the lever being notched, as shown at 36, and bearing against a point of a screw 37, screwed into the top of said loop to avoid friction. The lower end of the rod passes through a suitable guide 38 and is connected to a lower loop 39, which has a sharp knife-edge 79, upon which can rest the flat lower surface of an arm 40 of a scale-beam 41, pivoted at 42 upon a support 43, resting upon the base of the machine, through which support passes a stem 44, the lower end of which is attached by a link 45, pivoted to a plate 46, adjustably secured upon the under side of a boss 47, formed upon the under surface of the base 1. Said stem 44 carries at the upper end a scale-pan 48, upon which the bag (shown at 49) for containing the material to be weighed is placed. Said scale-beam carries a counterbalance-weight 50 and also a movable weight 51, which is moved along a graduated scale 52, secured to the scale-beam. The latter weight when placed at zero on the scale-beam will balance the heavy counterbalance-weight at the end of the beam; but as it is moved from zero along the scale-beam an additional weight is required to balance said counterbalance-weight, and this additional weight is the measure of the material to be weighed. When said weight 51 has been so moved to the desired point, the scale-beam will tilt upward and the long end of said scale-beam will contact with the upper check-pin 53. In the position of the parts at the commencement of the operation of weighing when the operator has actuated the lever 24, which has raised the valve-stem 10, the finger 27 then locking the valve-stem, the lower loop 39, the rod 34, and the upper loop 33 will all be elevated, as shown in Fig. 5. If now we were to disregard the sugar in transit from the spout to the bag, the operation of the device would be as follows: As soon as the amount of sugar in the bag was sufficient, together with the weight 51, to overcome the weight of the counterbalance the long arm of the scale-beam would descend, carrying with it the lower loop, and thereby tilting the lever 28 and withdrawing the finger 27 from the notch 26 and allowing the valve 11 to descend and close; but owing to the fact that there would still be a certain amount of sugar which would at the time of closure of the valve have passed the valve and not yet reached the bag this weighing would be inaccurate, the amount being in excess, and to remedy this inaccuracy I provide an equalizing or auxiliary lever 55, pivoted upon that standard 2 which is next the long arm of the scale-beam, said lever 55 having an arm 56, which bears down upon the long arm of the scale-beam, and also a weight 57, adjustable by means of a plate 58, which engages notches 59 and is clamped in any desired position by means of a clamping-screw 60. This weight causes the arm of the auxiliary lever to bear down upon the scale-beam with a pressure which assists the weight 51 in overcoming the counterbalance-weight, this pressure varying, of course, according to the position of the weight 57 upon the lever 55. It is necessary to vary this pressure on account of the fact that different pressures are necessary when weighing different amounts of sugar or other material, because the inertia to be overcome varies and also because the distance through which the material falls varies, according to the size and shape of the bag and the amount of material therein. This weight 57 is so adjusted that the scale-beam will begin to descend before the required amount of sugar is in the bag; but the proper amount will finally be in the bag. The auxiliary lever is graduated so that it can be set so that the scale will balance exactly when the full amount is on the scale-pan which was to be weighed, and it does not interfere with the independent action of the scale.

When the scale-beam is at rest in its upper position, it is some distance above the bottom of the loop 39, so that it falls before striking the loop. It thereby gains momentum by its own weight and that of the auxiliary lever and weight 57, which momentum increases as the weight 57 falls. Thus when the scale-beam strikes the bottom of the loop 39 the tripping takes place instantaneously. When the rod 34 and loop 39 fall, the loop 39 is clear of the scale-beam, which extends about centrally therethrough, and then indicates the weight of the material entirely independently of the tripping mechanism. The fall of the lever 55 is arrested by a lug 61 thereon striking the under side of the lug 38.

From the end of the scale-beam extends an arm 62 at right angles thereto, which carries an index-finger 63, which travels over a graduated scale 64, the latter being graduated in fractions of an ounce and the finger indicating by its position centrally of the scale that the exact amount of sugar or granular material desired has been weighed.

Upon a rod 65, extending from the base to the edge of the hopper, is adjustably secured by a set-screw 66 a sleeve 67, attached to an arm 68, in which is adjustably mounted a horizontal arm 69, bent down at its end, said depending portion 70 being centrally bored and carrying therein a plunger 71, pressed down by a spring 72. In the lower end of said depending portion is secured the end of a piece of wire 73 in the form of a circle, said wire making a complete turn and its end being then passed through a transverse slot 74 in said depending portion and said end being then bent or coiled around the first portion of the wire, as shown at 75. The plunger bears down upon the loose end of the wire and holds it in position; but at the same time on account of the coiled end being adapted to be passed to and fro on the fixed end the circle formed by the wire can be enlarged or diminished, as required. This piece of wire is thus held firmly in position as a bag-holder, and the upper edge of the bag is placed around the same, thus upholding the bag while it is being filled. Until the bag is filled with sugar to the desired amount it is on a higher level than when it has been filled on account of its rising and falling with the long arm of the scale-beam. When the bag has been filled, the upper edge of the bag drops down below the bag-holder, so that it can readily be removed sidewise.

77 is a screw screwed through the finger 27, which bears against the side of the stem when the finger 27 is moved upward by means of the lever 24, thus saving wear upon the end of the trigger-finger 27.

I claim—

1. In an apparatus of the character described, the combination of a hopper, a spout secured in the mouth of the hopper, upper and lower bearings in said spout, a valve having a vertical stem sliding in said bearings and being conical in form and formed with a sharp lower edge adapted to strike the surface of the hopper at substantially a right angle and to cut into two any granular material caught therebetween, and a conical shield supported upon the hopper above the valve, substantially as described.

2. In an apparatus of the character described, the combination of a hopper, a spout depending therefrom having a central web, a valve, a stem therefor, upper and lower bearings in the web for the stem and a tripping device engaging said stem between the upper and lower bearings, substantially as described.

3. In an apparatus of the character described, the combination of a hopper, a spout depending therefrom having a vertical web, said web having a vertical slot, a valve, a vertically-sliding stem therefor passing across said slot, a lever passing horizontally through said slot, and a device operated by said lever and engaging said stem to release the same to close the valve, substantially as described.

4. In an apparatus of the character described, the combination of a hopper having a spout depending therefrom and having a vertical web formed with a vertical slot, an apertured connection between the web and the side of the spout, a valve, a stem therefor passing vertically through said slot, and means passing through said apertured connection for raising the valve, substantially as described.

5. In an apparatus of the character described, the combination of a hopper having a spout depending therefrom and having a vertical web formed with a vertical slot, an apertured connection between the web and the side of the spout, a valve, a stem therefor passing vertically through said slot, a pin secured to the stem and passing through said apertured connection, and means on the outside of the spout for raising the pin, substantially as described.

6. In an apparatus of the character described, the combination of a hopper having a spout depending therefrom, said spout having a vertical web with a vertical slot therein, a valve, a vertically-sliding valve-stem passing through said slot, and having a notch formed in the side thereof, a horizontally-extending lever, a finger carried upon said lever and adapted to engage said notch, and means operated by the weight of the material being weighed for actuating said lever to withdraw said finger, substantially as described.

7. In an apparatus of the character described, the combination of a hopper having a spout depending therefrom, said spout having a vertical web with a vertical slot therein, a valve, a vertically-sliding valve-stem passing through said slot, and having a notch formed in the side thereof, a horizontally-extending lever, a finger carried upon said lever and adapted to engage said notch, a weight carried by said lever, means for adjusting the weight upon the lever, and means operated by the weight of the material being weighed for actuating said lever to withdraw said finger, substantially as described.

8. In an apparatus of the character described, the combination of a valve, adapted to arrest the descent of the material, a stem therefor having a notch, a lever, a finger carried by said lever and adapted to engage said notch, means operated by the descent of the material for actuating the lever to withdraw the finger, and a weight adjustably carried upon the lever, substantially as described.

9. In an apparatus of the character described, the combination of a valve, adapted to arrest the descent of the material, a stem therefor having a notch, a lever, a finger carried by said lever and adapted to engage said notch, means carried by said finger for maintaining the end of the finger out of contact with the stem when said end is above the notch, means operated by the descent of the material for actuating the lever to withdraw the finger, and a weight adjustably carried upon the lever, substantially as described.

10. In an apparatus of the character described, the combination of a valve adapted to arrest the descent of the material, a valve-stem, a tripping mechanism engaging said valve-stem comprising a lever, a vertical rod operatively connected with said lever, a scale-beam having a counterbalance-weight on the opposite side to the scale-pan, the long arm of the lever being on the same side as the scale-pan and being graduated, a movable weight on said long arm, the long arm of the lever being operatively connected to the vertical rod to draw the same down when the weight on the scale-pan together with the movable weight overcomes the counterbalance weight, substantially as described.

11. In an apparatus of the character described, the combination of a scale-beam, a counterbalance-weight upon the short arm, a scale-pan supported by the long arm, upper and lower check-pins between which the scale-beam oscillates, a vertically-moving rod adapted to be engaged by the scale-beam to draw it downward, a valve controlling the descent of the material to be weighed, a tripping device controlling the movement of said valve, and an operative connection between said tripping device and vertical rod whereby the downward movement of the rod operates the tripping device to release the valve, substantially as described.

12. In an apparatus of the character described, the combination of a scale-beam arranged to descend when the proper amount is weighed, fixed check-pins between which the end of the scale-beam oscillates, a vertically-moving rod having a loop through which the end of the scale-beam passes, a valve controlling the descent of the material, and a tripping device for said valve operatively connected with the upper end of the rod to release the valve when the rod descends, substantially as described.

13. In an apparatus of the character described, the combination of a scale-beam arranged to descend when the proper amount is weighed, fixed check-pins between which the end of the scale-beam oscillates, a vertically-moving rod having a loop through which the end of the scale-beam passes, a valve controlling the descent of the material, an equalizing-lever bearing down upon the long arm of the scale-beam to start the descent of the scale-beam and close the valve before the full amount has fallen on to the scale-pan, and a tripping device for said valve operatively connected with the upper end of the rod to release the valve when the rod descends, substantially as described.

14. In an apparatus of the character described, the combination of a scale-beam arranged to descend when the proper amount is weighed, fixed check-pins between which the end of the scale-beam oscillates, a vertically-moving rod having a loop through which the end of the scale-beam passes, a valve controlling the descent of the material, an equalizing-lever bearing down upon the long arm of the scale-beam to start the descent of the scale-beam and close the valve before the full amount has fallen on to the scale-pan, a weight carried by said lever and means for adjusting the weight upon the lever, and a tripping device for said valve operatively connected with the upper end of the rod to release the valve when the rod descends, substantially as described.

15. In an apparatus of the character described, the combination of a scale-beam arranged to descend when the proper amount is weighed, a finger carried by the scale-beam, a graduated scale over which said finger travels, fixed check-pins between which the end of the scale-beam oscillates, a vertically-moving rod having a loop through which the end of the scale-beam passes, a valve controlling the descent of the material, and a tripping device for said valve operatively connected with the upper end of the rod to release the valve when the rod descends, substantially as described.

16. In a weighing-machine, the combination of a weighing-pan, a hopper discharging thereover, a gate for closing the discharge from the hopper, a tripping mechanism for controlling said gate, a rod suspended from said tripping mechanism, a device, moving with the pan, in proximity to which the rod passes, and a stop on said rod against which said device impinges in its movement with the descent of the pan to operate the tripping mechanism and permit the gate to close, substantially as described.

17. In a weighing-machine, the combination of a weighing-pan, a hopper having a chute, a gate closing said chute, means, located partly within the chute, operated by the movement of the pan for controlling said gate, and means for inclosing the portion of said means within the chute from contact with the material falling through said chute, substantially as described.

18. In an apparatus of the character described, the combination of a hopper, a chute, a gate for closing said chute, a scale, means operated thereby for controlling said gate, said means comprising a finger holding the gate open and pivoted in a line vertically below the point of pressure on the finger from the gate, substantially as described.

In witness whereof I have hereunto set my hand in the presence of two subscribing witnesses.

FRANK F. WEAR.

Witnesses:
FRANCIS M. WRIGHT,
BESSIE GORFINKEL.